United States Patent [19]

Sato

[11] 4,066,497

[45] Jan. 3, 1978

[54] ABNORMAL STATE DETECTING APPARATUS UTILIZING CONTROL ROD FOR USE IN NUCLEAR REACTOR

[75] Inventor: Takao Sato, Ibaraki, Japan

[73] Assignee: Hitachi, Ltd., Japan

[21] Appl. No.: 620,787

[22] Filed: Oct. 8, 1975

[30] Foreign Application Priority Data

Oct. 11, 1974    Japan .............................. 49-116093

[51] Int. Cl.² ..................... G21C 7/06; G21C 7/00; G21C 7/18

[52] U.S. Cl. ..................................... 176/22; 176/24; 176/34

[58] Field of Search ................. 176/22, 23, 24, 25, 176/34, 19, 36; 340/188 R

[56] References Cited

U.S. PATENT DOCUMENTS

| | | | |
|---|---|---|---|
| 3,105,029 | 9/1963 | Kouanic | 176/24 |
| 3,459,925 | 8/1969 | Goosey | 176/19 R |
| 3,656,074 | 4/1972 | Bevilacqua | 176/19 R |
| 3,780,292 | 12/1973 | Klar | 176/19 R |
| 3,906,469 | 9/1975 | Kronk | 176/19 R |

*Primary Examiner*—Verlin R. Pendegrass
*Assistant Examiner*—Donald P. Walsh
*Attorney, Agent, or Firm*—Craig & Antonelli

[57] ABSTRACT

A control rod position immediately after the application of an operation common for a control rod of the nuclear reactor and a mean value of outputs of a plurality of neutron detectors near its control rod are calculated. The control rod position at the termination of a time interval required for the control rod to move a predetermined distance and the mean value of outputs of the plurality of neutron detectors near its control rod are calculated. The amount of variations in the control rod position and the mean value contribute to judgement of abnormal state at each location in the nuclear reactor.

21 Claims, 13 Drawing Figures

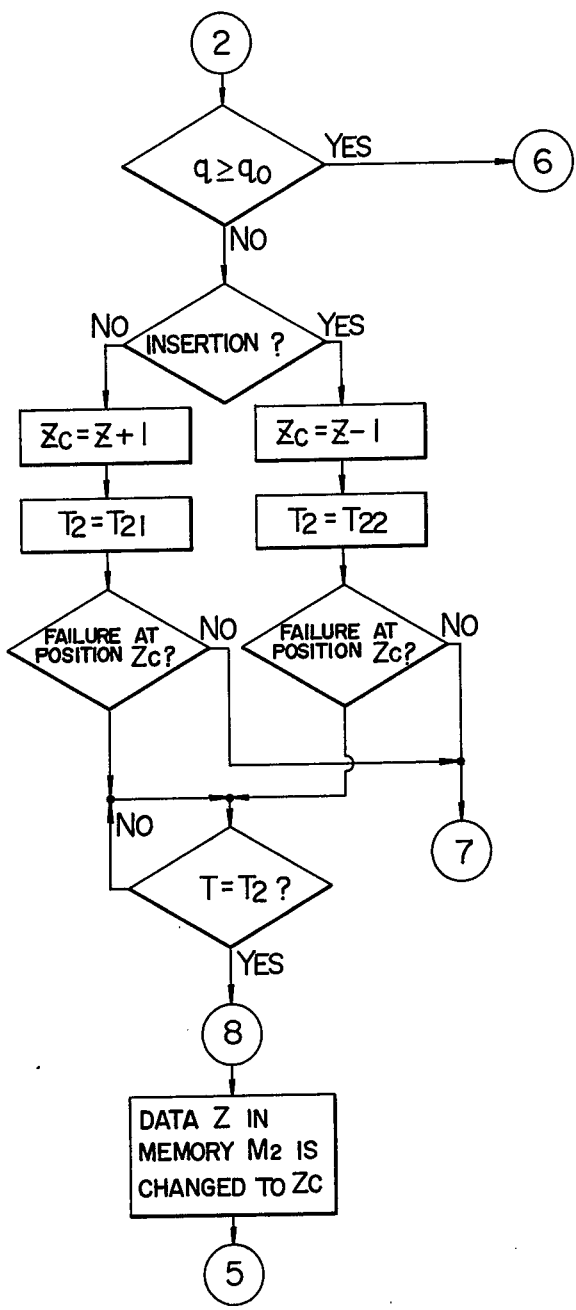

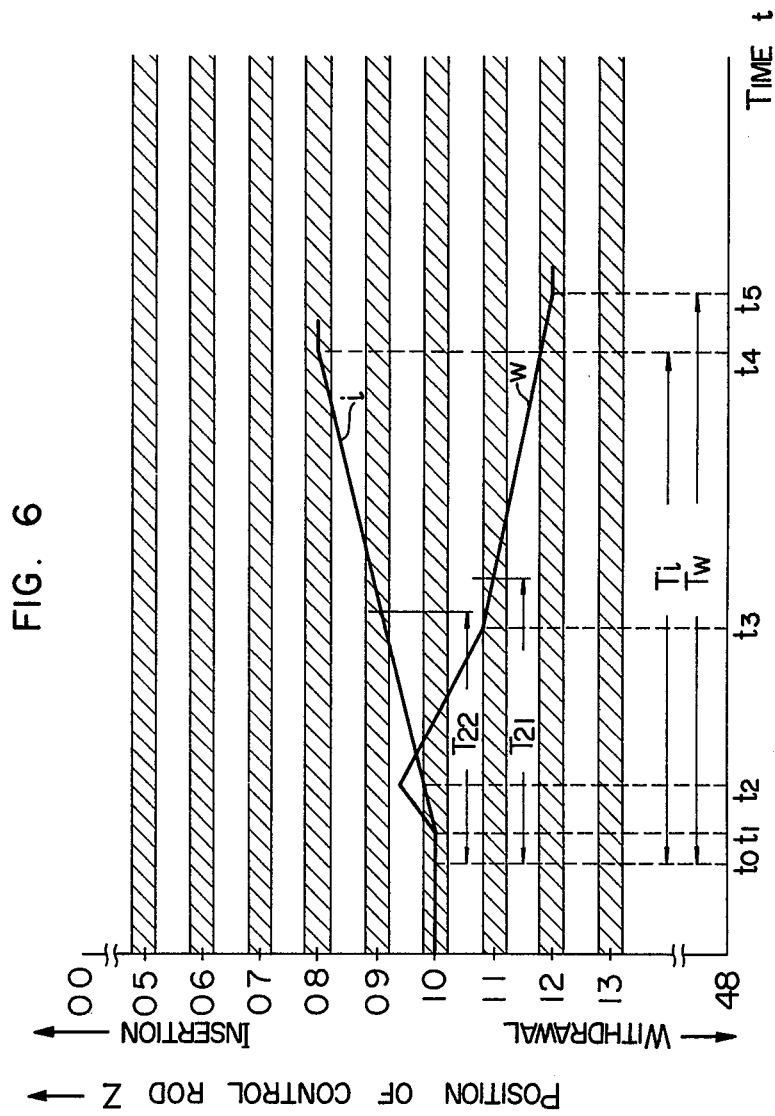

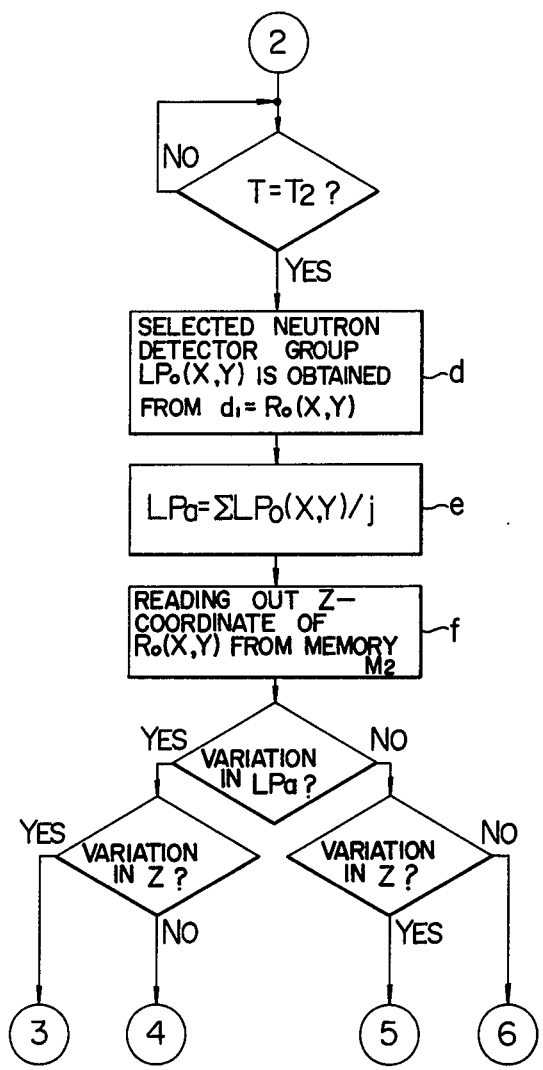

ABNORMAL STATE DETECTING APPARATUS UTILIZING CONTROL ROD FOR USE IN NUCLEAR REACTOR

BACKGROUND OF THE INVENTION

The present invention relates to a trouble detecting apparatus for the nuclear reactor controlling systems and more particularly an apparatus for detecting trouble at each location in the nuclear reactor controlling system when a control rod for the nuclear reactor is operated.

Various means of the nuclear reactor output controlling systems are available and especially in the Boiling Water Reactor, the following two means are in general use, one employing the positional control of the control rod and the other controlling the flow rate of recirculating flow in the nuclear reactor core. In the latter, the variation in output by controlling the flow rate of recirculating flow is almost uniformly produced in the nuclear reactor core whereas in the former, variation in output due to the operation of the control rod is produced in the vicinity of the operated control rod in case of the boiling water nuclear reactor. The output variation locally produced in this manner tends to cause local overheating and it is necessary to take a greater care, as compared with the latter controlling the flow rate of recirculating flow, in the output controlling, control rod position supervising and local output supervising.

In a nuclear reactor of 500 MWe class, about one hundred control rods are used and since the output of nuclear reactor is determined dependent on inserted positions (depth) of the control rods, there are provided position detectors associated with respective control rods for detecting an inserted position of each control rod. The position detector does not effect continuous detection of the position but detects predetermined positions to produce an output. More particularly, a member movable along with the control rod is provided with a magnet and reed switches are located such that the magnet can be brought into linkage with these reed switches. The reed switches are fixed at positions along the moving direction of the control rod and equally spaced within the stroke of the magnet corresponding to from the extreme insertion position to the extreme withdrawal position of the control rod. The reed switches are fifty in number, for example, and only a reed switch fully linked with the magnet approaching thereto can produce an output. The magnet coupled with the control rod is not allowed to stop at all positions of the fifty reed switches, but is allowed to stop every other position. Herein, unity of driven distance of the control rod is termed as "notch." Accordingly, distance between two reed switches is equal to ½ notch and three reed switches are spaced by one notch. The control rod is allowed to stop every one notch.

50 reed switches are employed for detecting the position of one control rod as described above, and the total number of reed switches used in the nuclear reactor amounts up to about 5000. Thus, a number of reed switches are prone to cause for failure in identifying the control rod position due to troubled reed switches during actual operation of the nuclear reactor. Hitherto, the control rod operation is manually effected and an operator can estimate the present position of the control rod, taking into consideration a local output and an amount of previous operation of the control rod, so that a continuous operation of the control rod was assured without affecting adversely on the safety operation of the nuclear reactor.

However, atomic power stations have increased in number today and they have shared a large portion of the total output of power stations. In this situation, there is arising need for intentionally varying loads of atomic power stations. To this end, the conventional manual operation of the control rods can not meet a quick response and automated operation is indispensable for controlling the control rods. In automated operation, simultaneous treatment of a number of information for judging the safety operation of the nuclear reactor is actually impossible and it is necessary to correctly know the present position of the control rod to be operated. Therefore, in the automated operation, when the present position of the control rod to be operated becomes unknown, identification of an amount of commanded operation with an amount of actual operation is prevented and unless controlled, the control rod moves randomly thus bringing the nuclear reactor into a very dangerous state. Further, there arise additional problems such as extreme difficulties in trouble judgement for automatic operation device and indistinctness of control rod reactivity worth.

In the automated operation, indistinctness of the control rod position gives rise to possible fatal accident and accordingly, in view of high security operation, the nuclear reactor should stop operating whenever only one of 5000 reed switches gets out of order. However, such stopage of the nuclear reactor in the event of failure of each reed switch and replacement of the troubled reed switch from the bottom of the reactor waste the availability of the nuclear reactor.

As has been described, it is of the most importance to know the inserted positions of all the control rods for automating the control rod operation.

On the other hand, the nuclear reactor controlling system has portions which must be supervised in connection with the movement of the control rod. Disengagement of the control rod poses a problem. Namely, the control rod is pushed upwardly toward the nuclear reactor core from the bottom thereof and a control rod body (neutron absorber) is connected to a hydraulic driving system through a connecting rod. Since the control rod body is sometimes replaced after subjected to a predetermined dosage of neutron flux and it is subjected to periodical maintenance and inspection, the control rod body cannot be constructed integrally with the connecting rod. Also the control rod body is so constructed as to be stopped every one notch in the nuclear reactor, as described above, and the magnet for detecting the position of control rod is carried on the connecting rod free from direct dose of radioactivity with the result that the control rod body alone is sometimes left in the nuclear reactor core and the position detector tends to indicate a different position. In such case, the control rod positioned at a different position from that indicated by the position detector causes reduction in the output of nuclear reactor, which reduction is compensated for by withdrawing another control rod. In contrast, the control rod hanging on the nuclear reactor core is caused to drop in the event that an earthquake strikes and as a result, a local output around the control rod is abruptly increased together with possible local overheating beyond the thermal threshold. In addition, the fuel assembly may be damaged by a shock due to the dropping of the control rod.

In the conventional nuclear reactor, control rods are withdrawn in an orderly manner to avoid a dangerous state in the event of the dropping accident and the sequence of withdrawal of control rods is supervised by means of a control rod reactivity worth minimizer. The minimizer is not protected completely from failure and an expedient for the detection of the disengagement has been desired.

Additionally, there are provided within the nuclear reactor core a plurality of local output detectors adjacent respective control rods. Outputs of the local output detectors are subjected to summation to produce a total output of the nuclear reactor while a local output of the detector is used as data for judging if the adjacent control rod is in condition to be withdrawn. In other words, a local output less than a predetermined value permits the withdrawal of control rod whereas a local output greater than the predetermined value blocks the withdrawal. Accordingly, in the event that the local output detector gets out of order, not only erroneous operation results but also transmission of erroneous data for supervising output distribution in the nuclear reactor and security of the reactor results.

As has been described, for automating the nuclear reactor controlling system, it is necessary to know correctly the inserted position of the control rods and to provide an apparatus capable of correctly judging abnormal state of the controlling system.

SUMMARY OF THE INVENTION

An object of the invention is to provide an apparatus capable of judging an abnormal state of the nuclear reactor controlling system.

In accordance with the invention, by comparing a state immediately after the application of an operation command for a control rod with another state at the termination of a time interval required for the control rod to move a predetermined distance, an abnormal state of the nuclear reactor system is detected and abnormal locations are judged.

BRIEF DESCRIPTION OF THE DRAWINGS

FIGS. 5A to 5C are flow charts useful to explain the concept of the invention.

FIG. 6 is a timing chart showing the relation between control rod position and time.

FIGS. 7A to 7D are flow charts useful to explain another embodiment of the invention.

DETAILED DESCRIPTION OF THE PREFERRED EMBODIMENTS

Figure 1:
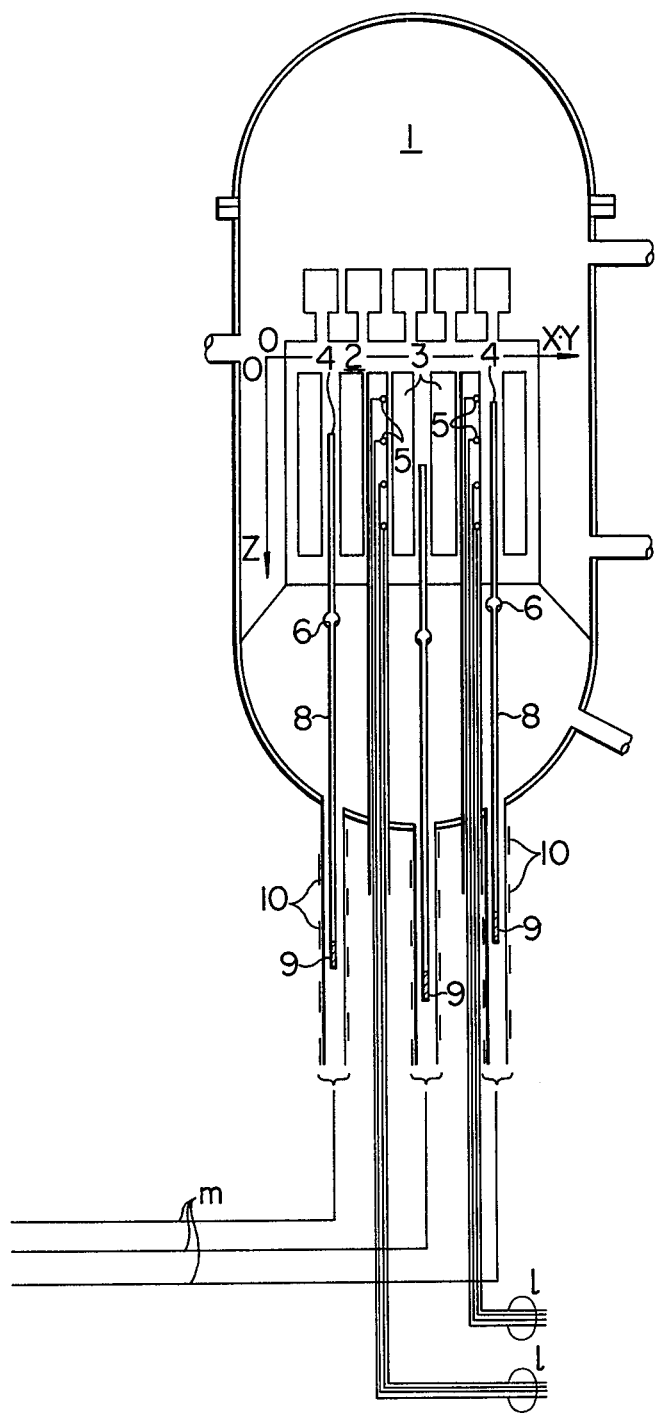
FIG. 1 is a schematic representation of a nuclear reactor to which the invention is directed, especially showing an arrangement of control rods, position detectors and local output detectors.
Figure 2:
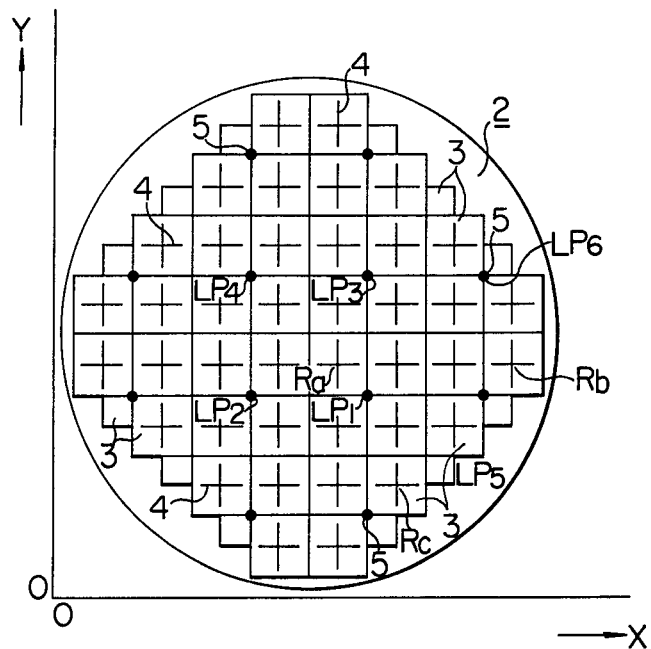
FIG. 2 is a cross-sectional view of the nuclear reactor of FIG. 1.

FIG. 1 shows a nuclear reactor to which the invention is directed, especially a structural arrangement of control rods and position detectors therefor as well as local output detectors. In the figure, numeral 1 designates a nuclear reactor pressure vessel within which a reactor core is imcorporated. The reactor core has a cross-sectional view as shown in FIG. 2. However, the reactor core is so sophisticated that an illustration of a practical reactor core encounters difficulties. Accordingly, it is to be noted that FIGS. 1 and 2 show only minimum constituents necessary for depicting the reactor core. As shown in FIG. 2, control rods 4 are arranged in equally spaced relationship. Betweeen the control rods 4 are disposed fuel assemblies 3. The control rods 4 and fuel assemblies 3 are arranged along the reactor core 2 to take a substantially circular configuration. Also, adjacent to respective control rods are disposed local output detectors 5. Returning to FIG. 1, the local output detector 5 includes four detector units located in the longitudinal direction of the control rod 4. Outputs of these detector units are each delivered outside the nuclear reactor through output leads $l$. For the nuclear reactor of the class of 800 MWe, the number of local output detectors having each four detector units amounts to 31 so that the total number of detector units becomes $31 \times 4 = 124$. Accordingly, the number of the output leads l also amounts to 124. On the other hand, the control rods 4 are inserted into the reactor core for controlling the reactivity of the nuclear reactor and respective control rods are associated with position detectors each of which detects a location of the control rod. A magnet 9 mounted on a portion of a connecting rod 8, which connecting rod is cooperatively movable with the control rod 4, and a reed switch 10 constitute the position detector. Fifty reed switches are provided for one control rod so that the total number of reed switches amounts to five thousands. Each set of a plurality of output leads $m$ delivers fifty reed switch outputs associated with one control rod. In FIG. 1, there is also shown a coupling member 6 which connects the control rod 4 and the connecting rod 8.

The nuclear reactor with the construction generally described above has a number of fuel assemblies 3, a number of control rods 4 and a number of local output detectors 5, and these members are discriminated from each other by the aid of a coordinate. More particularly, an X - Y coordinate, for example, is assumed in FIG. 2 showing the cross-sectional view of the nuclear reactor and a Z coordinate is assumed in the direction of the length of control rod in connection with FIG. 1. Accordingly, a position of the fuel assembly 3, an inserted position of the control rod 4 and a located position of the local output detector 5 are represented by F(X, Y), R(X, Y, Z) and LP(X, Y, Z), respectively. It will be noted that R(X, Y) represents a two-dimensional position of the control rod which is inserted up to an inserted position corresponding to R(X, Y, Z).

Figure 3A:
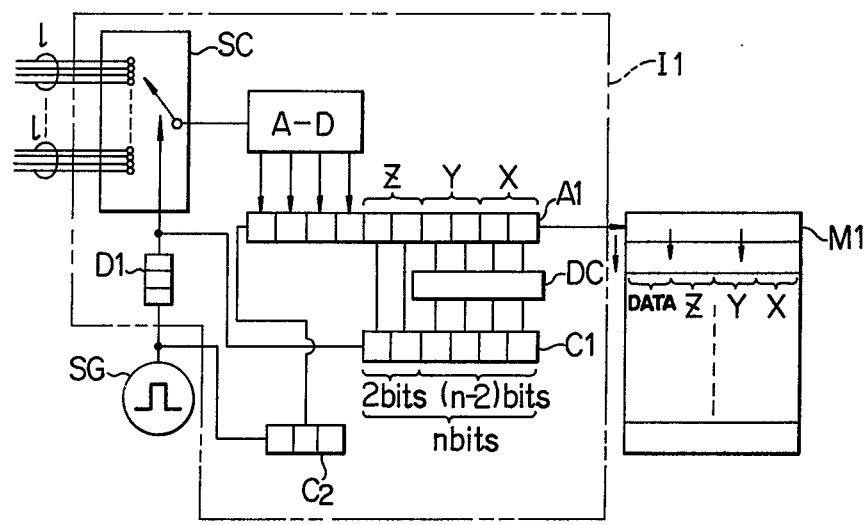
FIGS. 3A and 3B are circuit diagram of input devices for outputs from local output detectors and position detectors, respectively.
Figure 3B:
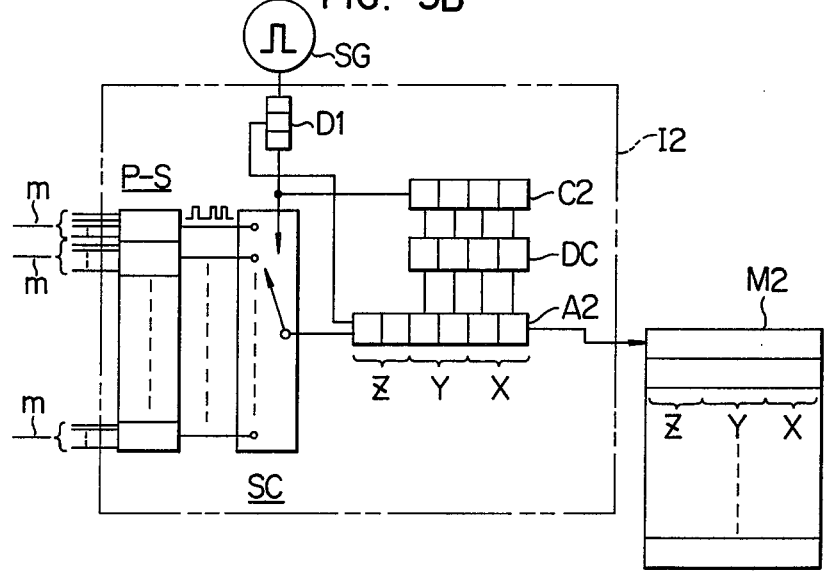

FIGS. 3A and 3B show how outputs delivered through the output leads $l$ and $m$ connected as above are processed. First, the process of the output signal of the local output detector 5 will be described with reference to FIG. 3A. All sets of output leads $l$ are directed to a scanner SC comprised by an input device $I_1$ and outputs are sequentially delivered to an analog-digital converter A -D. Scanning by the scanner SC is performed in such a predetermined order as all the outputs from the local output detectors assuming the same two-dimensional position are scanned with the scanner and after completion of scanning for these detector outputs, outputs from the local output detectors assuming a subsequent two-dimensional position are scanned. In addition, scanning for the four local output detectors assuming the same two-dimensional position is performed, for example, from the uppermost detector located at the upper portion of nuclear reactor to lower ones. Symbol SG designates a pulse signal generator the output frequency of which is divided by $\frac{1}{2^k}$ by means of a frequency divider D1 of $k$ bits. Pulses thus produced are used for assuring a timed scanning by the scanner SC. Symbol C1 designates an $n$ bit counter which sequentially counts the output of the frequency divider D1, where $n$ is selected such that $2^n$ becomes equal to the total number of neutron detectors. On the other hand, an accumulator designated by A1 comprises a coordinate portion for registering X, Y and Z coordinate data and a data portion for registering the output of the analog-digital converter A-D. Since a Z-coordinate part is received with outputs of lower two bits from the counter C1, four kinds of binary coded data ranging from "00" to "11" are registered in this part. The counter C1 which is synchronized with a timed scanning by the scanner SC assures correspondence of the data to be registered in the Z-coordinate part with Z coordinates of the local output detectors assuming respective two-dimensional positions. When the lower third bit of the counter C1 is received with a datum, the scannings of four data for a specified two-dimensional position LP(X, Y) have been finished and change of the X-Y coordinate is required. As described above, since the order of scanning has been predetermined, it is possible to determine an X -Y coordinate on the basis of data of upper ($n$ —2) bits of the counter C1. Symbol DC designates a decoder for delivering the X-Y coordinate which has previously been registered to X, Y coordinate parts of the accumulator A1 on the basis of upper ($n$ —2) bits of the counter C1. On the other hand, a counter C2 is of the same $k$ bits as the frequency divider D1 and it delivers an output to the accumulator A1, immediately before the frequency divider D1 transmits an output, so as not only to register the contents of the accumulator A1 in a memory M1 but also reset the accumulator A1. Obviously, some expedient would be made to prevent the outputs of the analog-digital converter A-D, decoder DC and counter C1 from acting as external disturbance upon the contents of the accumulator A1 while data of the accumulator A1 is shifted to the memory M1. The memory M1 has a capacity sufficient to register all the X, Y and Z coordinate data for neutron detectors and data of the outputs from the A-D converter referring to the local output detectors.

Next, positional detection of the control rod will be described. With reference to FIG. 3B, a set of output leads $m$ from position detectors associated with one control rod comprises fifty lead wires, and outputs delivered through the output leads are converted into a serial signal train by a parallel-series converter P-S comprised by an input device I2. The parallel-series converter P-S has, in addition to the mere parallel to series conversion, a decoder function by which a serial signal train dependent on an inserted position Z of the control rod is produced in accordance with which inputs for 50 signals receive outputs from the position detectors. Sometimes, the magnet will stop at intermediate position of two reed switches and, in such case, both upper and lower reed switches relative to the magnet will not deliver any outputs. In such case, it is assumed that the position data of the presently transferred scanner is identical with that of previously transferred scanner. As described with reference to FIG. 3A, symbols SG, D1 and SC represent a pulse signal generator, $m$ bit frequency divider, and scanner, respectively. Symbol C2 designates a counter of $j$ bits acting while the scanning is being performed, where $2^j$ is the total number of control rods, and DC a decoder as describe with reference to FIG. 3A. Since the order of scanning for the control rods is registered, like the decoder of FIG. 3A, in the decoder DC of FIG. 3B, X and Y coordinate parts of an accumulator A2 are supplied with predetermined data in accordance with the contents of the counter C2. It is noted that immediately before the frequency divider D1 deliver an output to effect the scanning, data of the accumulator A2 are shifted and a coordinate signal representative of R(X, Y, Z) of the control rod is memorized into the memory M2. The memory M2 has a capacity sufficient to register X, Y and Z coordinates for all the control rods. In the manner as described above, for example, inserted position R(X, Y, Z) for all the control rods, outputs of all the neutron detectors and coordinate LP (X, Y, Z) are measured and memorized.

Figure 4:
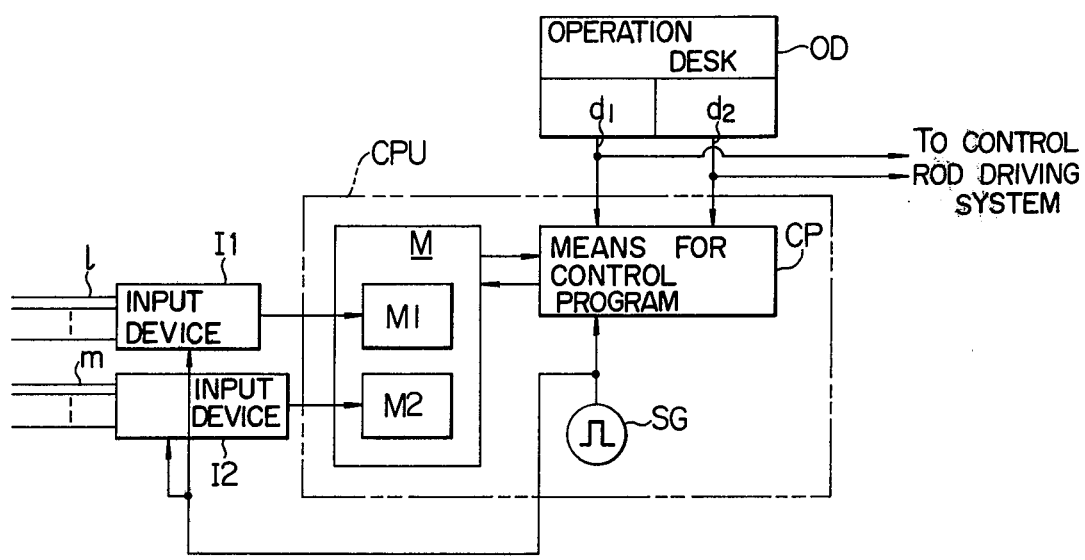
FIG. 4 is a schematic block diagram of an apparatus with a central processing unit embodying the invention.

Referring now to FIG. 4, there is shown a block diagram illustrating the relation between input and output when the apparatus of the invention is reduced to practice with an electronic computer CPU wherein, as described above in connection with FIG. 3, control rod position information R(X, Y, Z), outputs of the local output detectors and their coordinates LP (X, Y, Z) are inputted to and memorized in a memory device M. In addition to these inputs, data $d_1$ and $d_2$ concerning the operation of the control rod are supplied by an operation desk OD. These data are delivered by way of an operator or an automatic operation device (not shown) which is memorizing a predetermined control rod operating sequence. Data $d_1$ correspond to coordinates Ro (X, Y) of control rods to be operated (hereinafter referred to as selected control rods), and data $d_2$ manages the operating direction (either insertion or withdrawal). The data $d_1$ and $d_2$ are supplied sequentially, i.e., data $d_1$ are followed by data $d_2$. Symbol CP designates means for conducting a control program to be described later, which control program is started by receiving data $d_1$ and $d_2$. It is to be noted that the data $d_1$ and $d_2$ are transferred to a control rod driving mechanism (not shown) for the purpose of operating the control rods. Symbol SG designates a pulse signal generator, like one shown in FIG. 3, which is adapted to assure timed operation of input devices I1 and I2 and timed operation in the electronic computer CPU. The operation of the apparatus of the invention will be described in the following.

Figure 5A:
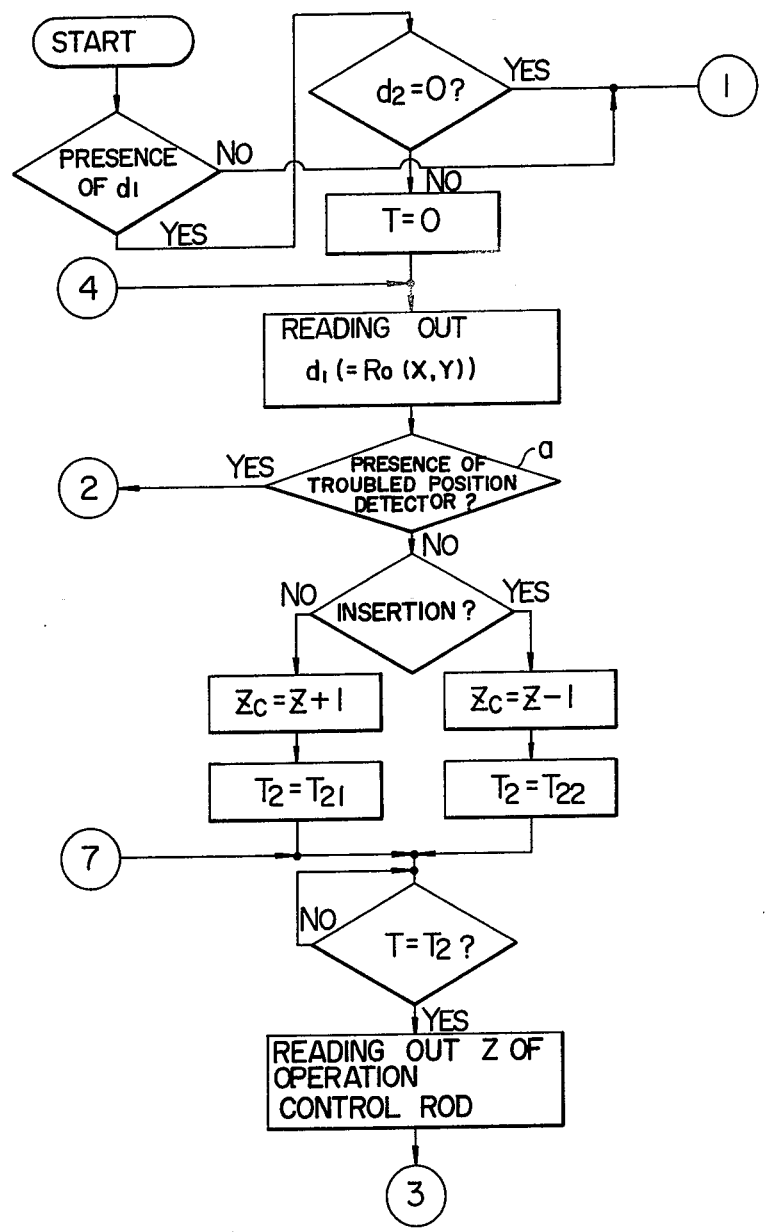
Figure 5B:
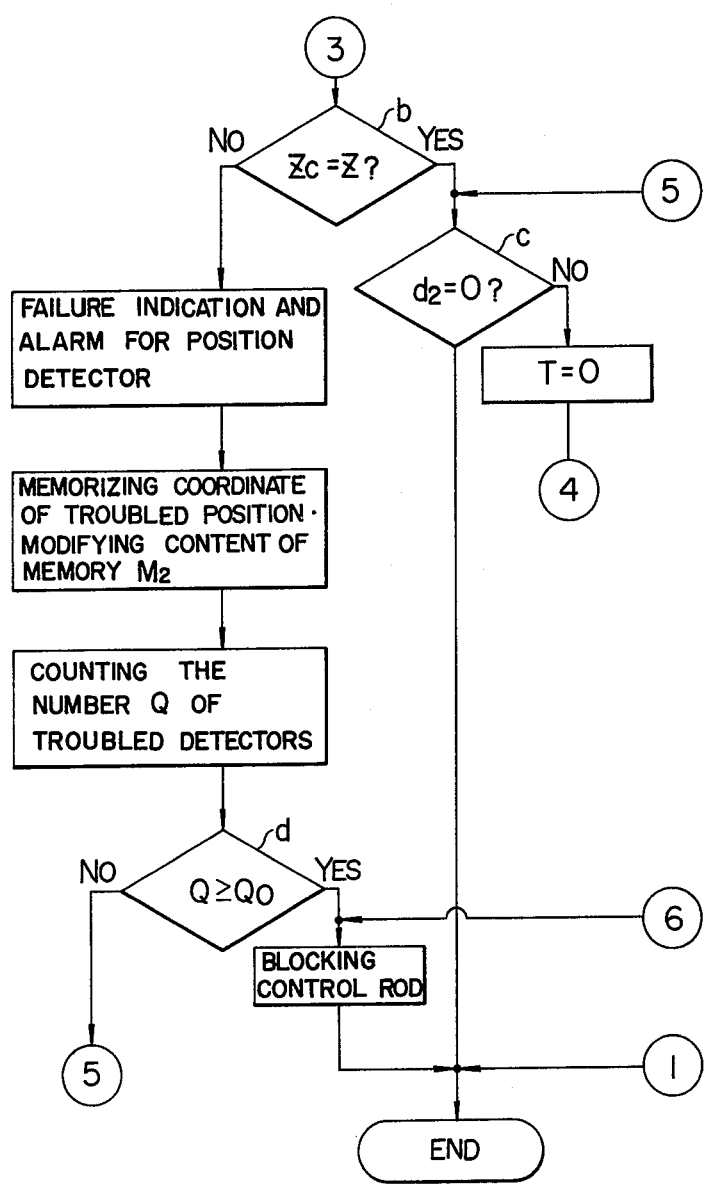

The apparatus of the invention has two principal functions: one is concerned with the positional detection of the control rod and the other is to judge abnormal state of the nuclear reactor controlling system. For the former function, operations signals $d_1$ and $d_2$ for the control rod and control rod position signal are exclusively needed. FIGS. 5A to 5C show a series of program adaptable to this function. First, presence or absence of a control rod selecting signal $d_1$ is judged and then presence or absence of an operation signal $d_2$ is judged. Coexistence alone permits the program to be advanced. If such condition is not satisfied, the program is stopped to flow and returned to start. With a timer T set to zero, a subsequent program is started. Signal $d_2$ is to manage the insertion or withdrawal of the control rod and nullified signal $d_2$ corresponds to no insertion or withdrawal operation. Positive sense of signal $d_2$ corresponds to withdrawal and negative sense corresponds to insertion. On the other hand, signal $d_1$ indicates a coordinate Ro(X, Y) of the selected control rod. During the following step $a$, it is judged whether or not trouble or failure has been caused in 50 position detectors associated with the control rod assuming the coordinate Ro(X, Y). When no trouble has been caused, the sense of data $d_2$ is judged to determine either insertion or withdrawal. If insertion, $Zc = Z - 1$ and $T_2 = T_{22}$ are calculated; if withdrawal, $Zc = Z + 1$ and $T_2 = T_{21}$ are calculated, where Z corresponds to the present position of the control rod, Zc a position of position detector which is to deliver a subsequent output, and $T_2$ a waiting time. FIG. 6 is a timing chart showing how the insertion and withdrawal of the control rod are performed in accordance with time, where abscissa represents time and ordinate control rod position. Generally, the extreme insertion position is designated at "00" and the extreme withdrawal position is designated at "48". For easy understanding, the extreme insertion position is located on the uppermost in FIG. 6. Within the range of hatched areas, position detectors deliver outputs. The control rod, however, cannot stop at all the positions where position detectors are located but is constructed to stop exclusively at even position detectors. In other words, a latch structure is employed in which the connecting rod 8 of FIG. 1 is formed with horizontal circumferential grooves, not specifically shown, and collet fingers are fitted in the grooves to prevent the control rod from being dropped. According to the latch structure, when inserting (in this direction the output is decreased since the control is pushed upwardly toward the nuclear reactor), the control rod can be pushed upwardly without any other action. However, when the control rod is withdrawn, the output, on one hand, is increased and the control rod, on the other hand, is positively applied with gravity proportional to its weight. Therefore, in consideration of security of the nuclear reactor, the control rod can be withdrawn only when the latch is released. The control rod is once pushed upwardly to release the latch. Curves $i$ and $w$ represent change in position during insertion and withdrawal, respectively. In FIG. 6, both operation commands $d_1$ and $d_2$ are applied at time $t_0$, and the control rod actually begins to move with a slight time lag, i.e., at time $t_1$. The difference $(t_1 - t_0)$ is negligibly small as compared with operating time interval for one notch. In case of insertion $i$, one notch operation is completed at time $t_4$. The control rod is operated at a dash between time $t_1$ and time $t_4$. In case of withdrawal $w$, on the other hand, after once pushed upwardly to release the latch, the control rod is withdrawn. This operation is not done at a dash but withdrawal rate is changed at time $t_2$ and time $t_3$. Generally, the withdrawal is performed at a lower speed than the insertion. Namely, between time interval Tw from $t_0$ to $t_5$ and time interval Ti from $t_0$ to $t_4$, Tw > Ti holds. "$T_{21}$" and "$T_{22}$" mentioned hereinbefore are defined as $T_{21} = Tw/2$ and $T_{22} = Ti/2$, respectively. If time interval between time $t_0$ and $t_1$ is negligibly small as mentioned hereinbefore, time interval $T_{22}$ teminates approximately at an intermediate between time $t_1$ and time $t_4$, and time interval $T_{21}$ terminates approximately at an intermediate between time $t_1$ and time $t_5$. It is a matter of importance that the position detector can produce an output satisfactorily not only when the control rod is driven at a constant rate as shown at curve $i$ but also when the driving rate is changed in the way as shown at curve $w$. Thus, in accordance with the invention, every time that time intervals $T_{21}$ and $T_{22}$ terminate, it is checked if the position detector produces an output at an estimated position Zc.

Returning again to FIG. 5, after the position Zc and time interval $T_2$ are calculated, it is judged if the timer T has completed the time interval $T_2$; at the termination of time interval $T_2$, data Z concerning the control rod presently operated are derived from control rod coordinate data R(X, Y, Z) which have been memorized in the memory $M_2$. It will be noted that the input device $I_2$ is constantly operated irrespective of the flow state of program shown in FIG. 5 and time to be required for changing coordinate data R(X, Y, Z) concerning all the control rods is extremely small as compared with the waiting time $T_2$. Therefore, it is expected that data Z at the termination of time interval $T_2$ will be renewed as far as the control rod is moved correctly. As shown in FIG. 5B, the estimated position Zc is compared with the present position Z at step $b$. If $Zc = Z$, the position detector is judged to be in correct operation and step $c$ follows at which presence or absence of the operation signal $d_2$ is judged. If the operation signal $d_2$ is absent, it is determined that a scheduled operation has been completed and the whole programing according to this flow chart are stopped. If the operation signal $d_2$ is present $(d_2 \neq 0)$, the control rod is located at an odd position detector, for example, and the program is continued by setting the timer T to zero to return to point ④ in FIG. 5A, and repeated by the following operation. If it is judged that $Zc \neq Z$ in step $b$, the position detector located at this position is possibly out of order and an operator will be informed of the failure of the position detector through alarm or indication. The coordinate representative of the position of the troubled position detector is memorized, the contents of the memory $M_2$ are modified and the number Q of troubled position detectors is counted. In step $d$, it is judged if the number Q exceeds a predetermined value $Q_o$, and if $Q \geq Q_o$ all the control rods are blocked to operate to assure safe operation of the nuclear reactor and the flow of program is stopped. If $Q < Q_o$ the program is advanced to step C since the operation is considered possible and the operation will be continued in step C having already been described. In case where it is judged in step $a$ that the selected control rod assuming the coordinate Ro (X, Y) is associated with troubled position detectors, the program is advanced according to FIG. 5C.

In FIG. 5C, the number $q$ of troubled position detectors associated with the selected control rod is counted and it is judged if the number $q$ exceeds a predetermined value qo. If $q \geq qo$, the program is advanced to point ⑥ in FIG. 5B thereby to block the operation of the control rod. If $q < qo$, the program is advanced to next step since safe operation of the control rod is possibly assured. In this step, it is judged by the sense of operation signal $d_2$ that either insertion or withdrawal is to be performed; for the insertion, $Zc = Z - 1$ and $T_2 = T_{22}$ are calculated and for the withdrawal, $Zc = Z + 1$ and $T_2 = T_{21}$ are calculated. Namely, the position Zc at which next output is produced is estimated and the time interval $T_2$ in which the control rod reaches the estimated position Zc is set. Next, it is judged if the position detector at the position Zc associated with respective two-dimensional positions has already been out of order. If not troubled, the program is advanced to point ⑦ and followed by the normal routine program. If the position detector is troubled at the position Zc, it is necessary to change the content of memory $M_2$ at the termination of waiting time $T_2$. Namely, at the termination of time interval $T_2$, data Z in the coordinate Ro (X, Y, Z) of the selected control rod which has been memorized in the memory $M_2$ are changed with data $Zc$. Since the trouble of this position detector is known before the program is started and the coordinate of troubled position has already been memorized, only modification of the memory $M_2$ is effected in this phase. Then, the program is advanced to point ⑤ and the same operation as described hereinbefore is repeated in accordance with presence or absence of the operation signal $d_2$.

As has been described in detail, according to the invention, in response to the operation signal $d_2$ the coordinate $Zc$ at which the position detector is to produce an output is estimated and the time interval $T_2$ which has elapsed before the output is produced is calculated. At the termination of the time interval $T_2$, the estimated position $Zc$ is compared with an actually detected positon $Z$. If result of the comparison is not coincident, it is judged that the position detector at position $Zc$ is out of order. When troubled position detectors are of minority, the operation of the control rod is continued on the assumption that the troubled position detectors are in normal operation whereas when the number of troubled position detectors amounts to a predetermined value, the following operation of the control rod is stopped. Accordingly, the apparatus of the invention assures the trouble-shooting for position detectors without requiring any special devices. Minority of troubled position detectors allows the operation of control rod to continue so that the working efficiency of an atomic power station can be improved drastically. Especially, in view of the number of position detectors amounting up to 5000 and high probability of getting troubled, a marked improvement in the working efficiency is obtainable as compared with the conventional control rod operation in which the control rod is stopped every time the position detector gets out of order.

Further, the apparatus of this invention judges abnormal locations in the nuclear reactor controlling system. The controlling system for 500 MWe class nuclear reactor has many devices such as about 100 control rods, about 5000 position detectors and about 100 neutron detectors and suffers from high probability of getting troubled. On the basis of correlation between these devices, the invention judges abnormal locations in the nuclear reactor controlling system.

The concept of the invention will be outlined. When the operation command $d_2$ is supplied, the control rod is moved through a control rod driving system with the result that the output of the position detector is varied and the output of the neutron detector near the selected control rod is varied. This is true when each device is in normal operation, but when only the neutron flux is varied, the position detector system is considered to be in trouble and when only the output of the position detector is varied, the local output detector is not considered to be abnormal since a plurality of outputs of the local output detectors near the selected control rod are averaged and the variation in the output of position detector is considered to be caused by disengagement of the coupling member from the control rod.

Figure 7A:
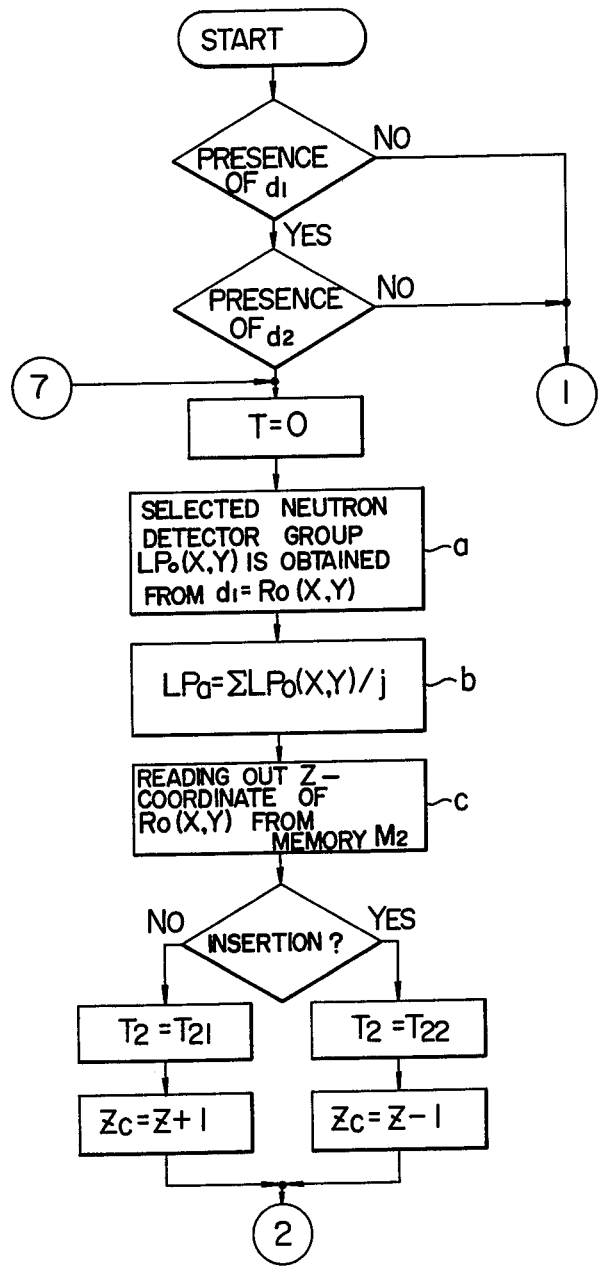
Figure 7C:
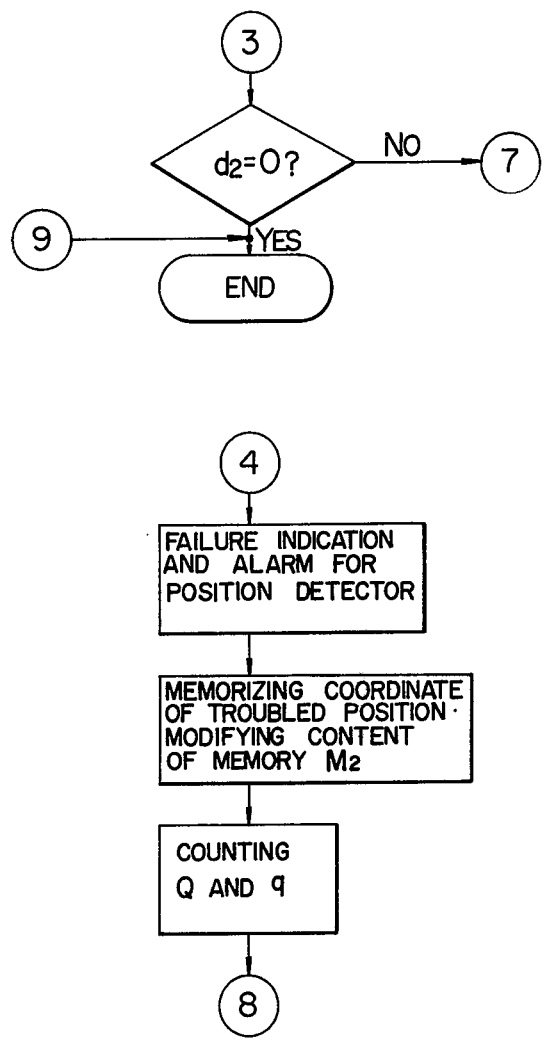
Figure 7D:
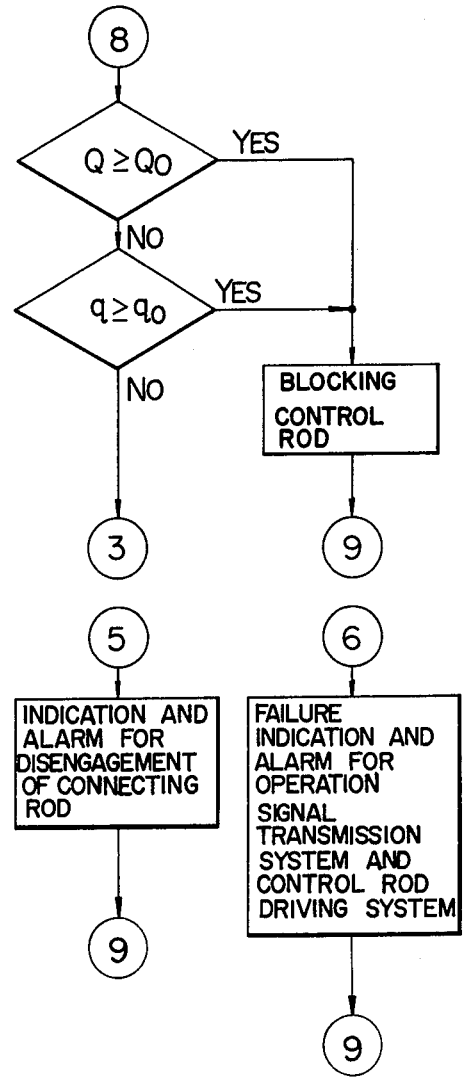

FIG. 7 shows in terms of a flow chart one embodiment of the invention based on the concept as described above. First, presence or absence of the control rod selecting signal $d_1$ as mentioned in connection with FIG. 4, $d_1 = Ro$ (X, Y), is judged and with absence of this signal, the program is not started. When the signal $d_1$ is present, presence or absence of the control rod operation signal $d_2$ is also judged. Absence of the operation signal $d_2$ prevents the control rod from being driven and the program will not start until the operation signal $d_2$ is supplied. The program is started by setting the timer T to zero. Eight or sixteen neutron detectors around the selected control rod (hereinafter referred to as selected neutron detector group $LPo$ (X, Y)) are selected in response to the signal $d_1$. This is detailed with reference to FIG. 2. Assumed that the selected control rod $Ro$ (X, Y) is a control rod $Ra$, the selected nuetron detector group $LRo$ (X, Y) around the control rod $Ra$ includes neutron detectors $LP_1$, $LP_2$, $LP_3$ and $LP_4$. Associated with a specified two-dimensional location, four neutron detectors are provided in Z direction so that the total number of the neutron detectors amounts to 16. When assumed that the selected control rod $Ro$ (X, Y) represents a control rod $Rb$, the control rod $Rb$ is associated with neutron detectors $LP_5$ and $LP_6$, the total number amounting to 8. Associated with a control rod $Rc$, for example, the total number of neutron detectors amounts to 12. Next, the outputs of the selected neutron detector group are averaged to obtain a mean value $LPa$ in accordance with formula $\Sigma LPo$ (X, Y)$/j$, where $j$ represents the number of detectors in one group. It is essential for the invention to calculate the mean value. Then, Z coordinates associated with $Ro$ (X, Y) are derived from the memory M2. To be described later, positions of the control rods presently located are memorized in the memory M2 irrespective of presence or absence of troubled position detectors. Accordingly, the Z coordinate associated with $Ro$ (X, Y) in the memory M2 is considered to indicate the present position of the selected control rod. In next phase, the waiting time interval T2 is determined by the sense of the operation signal $d_2$. Under the definition that the positive sense corresponds to withdrawal and the negative sense corresponds to insertion, $T_2 = T_{21}$ and $Zc = Z + 1$ are calculated for withdrawal, and $T_2 = T_{22}$ and $Zc = Z - 1$ are calculated for insertion. The coordinate $Zc$ corresponds to coordinate of a position detector which is scheduled to produce next output. After completion of the above program, the time interval $T_2$ elapses. At the termination of the time interval $T_2$, it is expected that variations is caused in the outputs of position detector and neutron detector and no variation caused indicates that some abnormal states are caused in the system. The program is advanced to the same operation steps $d$, $e$ and $f$ as previously described in steps $a$, $b$ and $c$. The mean values $LPa$ and $Z$ before the termination of the time interval $T_2$ are respectively compared with those after the termination of $T_2$. If the result of the comparison shows variations in $LPa$ and $Z$ exceeding predetermined values (point ③), the system is considered normal. In this case, presence or absence of the operation signal $d_2$ is judged and with the presence of signal $d_2$, the program is advanced to point ⑦ and continued along the same route as mentioned above; without the signal $d_2$, the program is completed. In case where the mean value $LPa$ is varied but the coordinate $Z$ is not varied (point ④), the position detector assuming the coordinate $Ro$ (X, Y, $Zc$) is considered to be out of order. Thus, position detector failure is indicated and alarmed, the coordinate $Ro$ (X, Y, $Zc$) of the failure position is memorized and the Z in the memory M2 is modified to $Zc$. By modifying the memory, the following operation is advanced on the assumption that the position detector at the coordinate $Zc$ is in normal operation. Next, the total number Q of the troubled position detectors and the number $q$ of troubled position detector associated with the coordinate Ro (X, Y) are obtained, and then as shown in FIG. 7D, it is judged if the total number Q and the number q exceed limited values Qo and qo, respectively. If either the total number Q or the number q exceeds the limited value, the program is advanced to point ⑨ of FIG. 7C to complete programming after the control rod operation has been blocked. If either the total number Q or the number q does not exceed the limited value, the program is advanced to point ③ of FIG. 7C and the following program is executed in response to presence or absence of the operation signal $d_2$ since it is expected that security of the control rod operation is assured.

In case where it is judged that the mean value LPa is not varied but the coordinate Z is varied (point ⑤), disengagement of the coupling member from the control rod is caused since the mean value LPa corresponds to an average of outputs of a plurality of local neutron detectors around the selected control rod of Ro (X, Y). This condition is dangerous to the continued control rod operation and the disengaged control rod is indicated and alarmed. Further, the program is advanced to point ⑨ of FIG. 7C to stop all the judgement according to the program and an operator is burdened with repairing task.

Finally, in case where both the mean value LPa and the coordinate Z are not varied (point ⑥), since the control rod is not moved (accordingly, no variation is caused in the output of the neutron detector) in spite of the application of operation commands $d_1$ and $d_2$, such condition is considered to be caused by the operation signal transmission system or the control rod driving system. In this case, further continuation of the operation is impossible and the accident is indicated and alarmed while the program is advanced to point ⑨ of FIG. 7C thereby to stop the following operation. As has been described in detail, the invention picks up the relation among the operation signal, control rod position and local neutron flux and assures the judgement of abnormal locations based on the fact that the application of the operation signal causes variations in the control rod position and local neutron flux.

Briefly, as embodied in FIGS. 5 and 7, the invention is based on the concept that abnormal state at each location can be judged by comparing a state immediately after the operation signal is supplied with another state at the termination of time interval through which the control rod is moved a predetermined distance. Accordingly, slight modification is possible within the scope of this concept. Although, in the foregoing embodiments, the time interval $T_2$ is defined as being required for moving the control rod, for example, by ½ notch. However, since the control rod is not allowed to stop every ½ notch, it is not always effective to check the state of the system every ½ notch. Alternatively, it is advisable that the time interval $T_2$ is defined as being required for moving the control rod by one notch and the state of the system is checked every even notch. In such modification, the estimated position Zc of the position detector which is to produce the next output is Zc = Z + 2 or Zc = Z − 2. Obviously, the invention can be reduced to practice through a specific hardware.

I claim:

1. An abnormal state detecting apparatus utilizing control rods for a nuclear reactor having a nuclear reactor core incorporated therein with a plurality of the control rods and a control rod driving device for moving selected control rods in an indicated direction for receiving a signal for selecting control rods to be operated and another signal for indicating a direction in which the control rod is moved, comprising;

a magnet provided on a member movable together with the control rod;

reed switches stationary provided on fixed positions arranged in an equally spaced manner in the direction of movement of the control rod for producing an output when said magnet approaches to said reed switches;

a first memory for memorizing outputs of position detectors associated with the control rod to be operated when supplied with the selection signal and the moving direction signal for the control rod;

a timer producing an output at the termination of a waiting time interval corresponding to the moving direction signal;

estimating means for estimating an output of the position detector at the termination of said waiting time interval by receiving an output of the first memory and the moving direction signal;

a second memory for memorizing an output of the position detector when the timer produces the output; and abnormal detecting means for determining an abnormal state when the output of the second memory does not coincide with the output of the estimating means.

2. An abnormal state detecting apparatus utilizing control rods for a nuclear reactor having a nuclear reactor core incorporated therein with a plurality of the control rods and a control rod driving device for driving said control rods in response to operation commands for control rods, comprising;

control rod position detectors for detecting an inserted position of each control rod;

a plurality of local output detectors disposed three-dimensionally in the nuclear reactor core for detecting a local output of the nuclear reactor;

a first comparator for comparing an output of said control rod position detector obtained immediately after the application of said operation command with another output of said control rod position detector obtained at the termination of a predetermined waiting time interval from said application;

a second comparator for comparing an output of said local output detector obtained immediately after said application with another output of said local output detector obtained at the termination of a predetermined waiting time interval from said application; and abnormal judging means for determining an abnormal state of the nuclear reactor and location of a fault position in accordance with the magnitude of each of outputs from said first and second comparators.

3. An abnormal state detecting apparatus utilizing control rods for a nuclear reactor having a nuclear reactor core incorporated therein with a plurality of the control rods and a control rod driving device for driving at least control rods selectively determined in response to a command signal for selecting the control rods, comprising;

control rod position detectors for detecting an inserted position of each control rod;

a plurality of local output detectors disposed three-dimensionally in the nuclear reactor core for detecting a local output of the nuclear reactor;

a first comparator for comparing an output of said control rod position detector obtained immediately after the application of said selecting command with another output of said control rod position detector obtained at the termination of a predetermined waiting time interval from said application;

a second comparator for comparing an output of said local output detector obtained immediately after said application with an output responsive to outputs of said local output detectors obtained at the termination of a predetermined waiting time interval from said application; and abnormal judging means for determining an abnormal state of the nuclear reactor and location of a fault position in accordance with the magnitude of each of outputs from said first and second comparators, said output responsive to outputs of said local output detectors being a mean value of outputs of a plurality of local output detectors around the control rod selectively determined by said selecting signal.

4. The abnormal state detecting apparatus according to claim 2 wherein said operation command signal determines at least a direction in which the control rod is operated and said waiting time interval is varied in accordance with the direction.

5. The abnormal state detecting apparatus according to claim 3 wherein said control rod driving device is actuated by receiving a signal for determining a direction in which the control rod is operated in addition to the control rod selecting signal, and the waiting time interval is varied in accordance with the operation direction signal.

6. The abnormal state detecting apparatus according to claim 2 wherein said control rod position detector includes a magnet provided on a member movable together with the control rod and reed switches provided on fixed positions arranged in an equally spaced manner in the direction of movement of the control rod for producing an output when said magnet approaches to said reed switch, and said waiting time interval corresponds to a mean time interval required for the control rod to pass through a distance corresponding to a distance between the reed switches.

7. The abnormal state detecting apparatus according to claim 3 wherein said control rod position detector includes a magnet provided on a member movable together with the control rod and reed switches provided on fixed positions arranged in an equally spaced manner in the direction of movement of the control rod for producing an output when said magnet approaches to said reed switch, and said waiting time interval corresponds to a mean time interval required for the control rod to pass through a distance corresponding to a distance between the reed switches.

8. The abnormal state detecting apparatus according to claim 4 wherein said control rod position detector includes a magnet provided on a member movable together with the control rod and reed switches provided on fixed positions arranged in an equally spaced manner in the direction of movement of the control rod for producing an output when said magnet approaches to said reed switch, and said waiting time interval corresponds to a mean time interval required for the control rod to pass through a distance corresponding to a distance between the reed switches.

9. The abnormal state detecting apparatus according to claim 5 wherein said control rod position detector includes a magnet provided on a member movable together with the control rod and reed switches provided on fixed positions arranged in an equally spaced manner in the direction of movement of the control rod for producing an output when said magnet approaches to said reed switch, and said waiting time interval corresponds to a mean time interval required for the control rod to pass through a distance corresponding to a distance between the reed switches.

10. An abnormal state detecting apparatus utilizing control rods for a nuclear reactor having a nuclear reactor core incorporated therein with a plurality of the control rods and a control rod driving device for moving selected control rods in an indicated direction by receiving a signal for selecting control rods to be operated and another signal for indicating a direction in which the control rod is moved, comprising;

a control rod position detector having a magnet provided on a member movable together with the control rod and reed switches provided on fixed positions arranged in an equally spaced manner in the direction of movement of the control rod for producing an output when said magnet approaches to said reed switch;

a plurality of local output detectors disposed three-dimensionally in the nuclear reactor core for detecting a local output of the nuclear reactor;

circuit means for averaging outputs of a plurality of local output detectors around a selected control rod in response to the control rod selecting signal;

first and second memories for respectively memorizing the output of the control rod position detector and that of the averaging circuit means obtained at the time when both the control rod selecting signal and operating direction signal are applied;

a timer for setting a waiting time interval in response to the operating direction signal and for producing an output at the termination of said waiting time interval;

estimating means for estimating an output of the position detector at the termination of said waiting time interval by receiving an output of the first memory and the operating direction signal;

third and fourth memories for respectively memorizing the output of the position detector and that of the averaging circuit means in response to the output of said timer;

a first comparator means for comparing the output of said estimating means with the output of said third memory;

a second comparator means for comparing the output of said second memory with the output of said fourth memory; and abnormal judging means for determining an abnormal state of the nuclear reactor and location of a fault position in accordance with results of comparison by said first and second comparator means.

11. An abnormal state detecting apparatus according to claim 2, wherein said local output detectors are neutron flux detectors for detecting a local neutron flux of the nuclear reactor.

12. An abnormal state detecting apparatus according to claim 3, wherein said local output detectors are neutron flux detectors for detecting a local neutron flux of the nuclear reactor.

13. An abnormal state detecting apparatus according to claim 10, wherein said local output detectors are neutron flux detectors for detecting a local neutron flux of the nuclear reactor.

14. An apparatus for detecting an abnormal state in a control system for a nuclear reactor having a nuclear reactor core incorporated therein with a plurality of control rods, a control rod driving device for driving a control rod selected in response to an operation command signal including a control rod selection signal, control rod position detectors for detecting respective inserted positions of said control rods, and a plurality of local output detectors arranged three-dimensionally in said nuclear reactor core for detecting local outputs of said nuclear reactor, comprising:

a first comparator receiving an output of a control rod position detector for a selected control rod obtained immediately after the application of said operation command signal, and receiving another output of said control rod position detector obtained at a time when a predetermined time has elapsed after said application;

a second comparator receiving an output of a local output detector obtained immediately after said application of said operation command signal, and receiving another output of said local output detector obtained at a time when said predetermined time has elapsed after said application, said local output detector being arranged in the vicinity of said selected control rod; and fault position detecting means receiving outputs of said first and second comparators for determining the location of a fault position in instruments provided in said nuclear reactor in accordance with the magnitude of each of said outputs of said first and second comparators.

15. An apparatus for detecting an abnormal state in a control system for a nuclear reactor according to claim 14, wherein said first comparator comprises first means for predicting, from a position and a moving direction of said selected control rod at the application of said operation command signal, another position of said selected control rod at a time when said predetermined time has elapsed after said application of said operation command signal, and second means for comparing an output of said first means with an output of said control rod position detector obtained at a time when said predetermined time has elapsed after said application of said operation command signal.

16. An apparatus for detecting an abnormal state in a control system for a nuclear reactor according to claim 14, wherein said second comparator receives a mean value of outputs of a plurality of local output detectors arranged in the vicinity of said selected control rod, said selected control rod being selected by said control rod selection signal.

17. An apparatus for detecting an abnormal state in a control system for a nuclear reactor according to claim 14, wherein said predetermined time is varied in accordance with the moving direction of a control rod, said moving direction being determined by said operation command signal.

18. An apparatus for detecting an abnormal state in a control system for a nuclear reactor according to claim 14, wherein said control rod position detector includes a magnet provided on a member movable together with a control rod and reed switches provided on fixed positions arranged in an equally spaced manner in the direction of movement of said control rod for producing an output when said magnet approaches to said reed switch, and said predetermined time corresponds to a mean time interval required for said control rod to pass through a distance corresponding to a distance between the reed switches.

19. An apparatus for detecting an abnormal state in a control system for a nuclear reactor according to claim 15, wherein said second comparator receives a mean value of outputs of a plurality of local output detectors arranged in the vicinity of said selected control rod, said selected control rod being selected by said control rod selection signal.

20. An apparatus for detecting an abnormal state in a control system for a nuclear reactor according to claim 19, wherein said predetermined time is varied in accordance with the moving direction of a control rod, said moving direction being determined by said operation command signal.

21. An apparatus for detecting an abnormal state in a control system for a nuclear reactor according to claim 20, wherein said control rod position detector includes a magnet provided on a member movable together with a control rod and reed switches provided on fixed positions arranged in an equally spaced manner in the direction of movement of said control rod for producing an output when said magnet approaches to said reed switch, and said predetermined time corresponds to a mean time interval required for said control rod to pass through a distance corresponding to a distance between the reed switches.

* * * * *